May 12, 1925.
F. H. GLEASON
MEANS FOR LUBRICATING TENSION SHACKLES OF AUTOMOBILES
Filed July 18, 1923
1,537,077
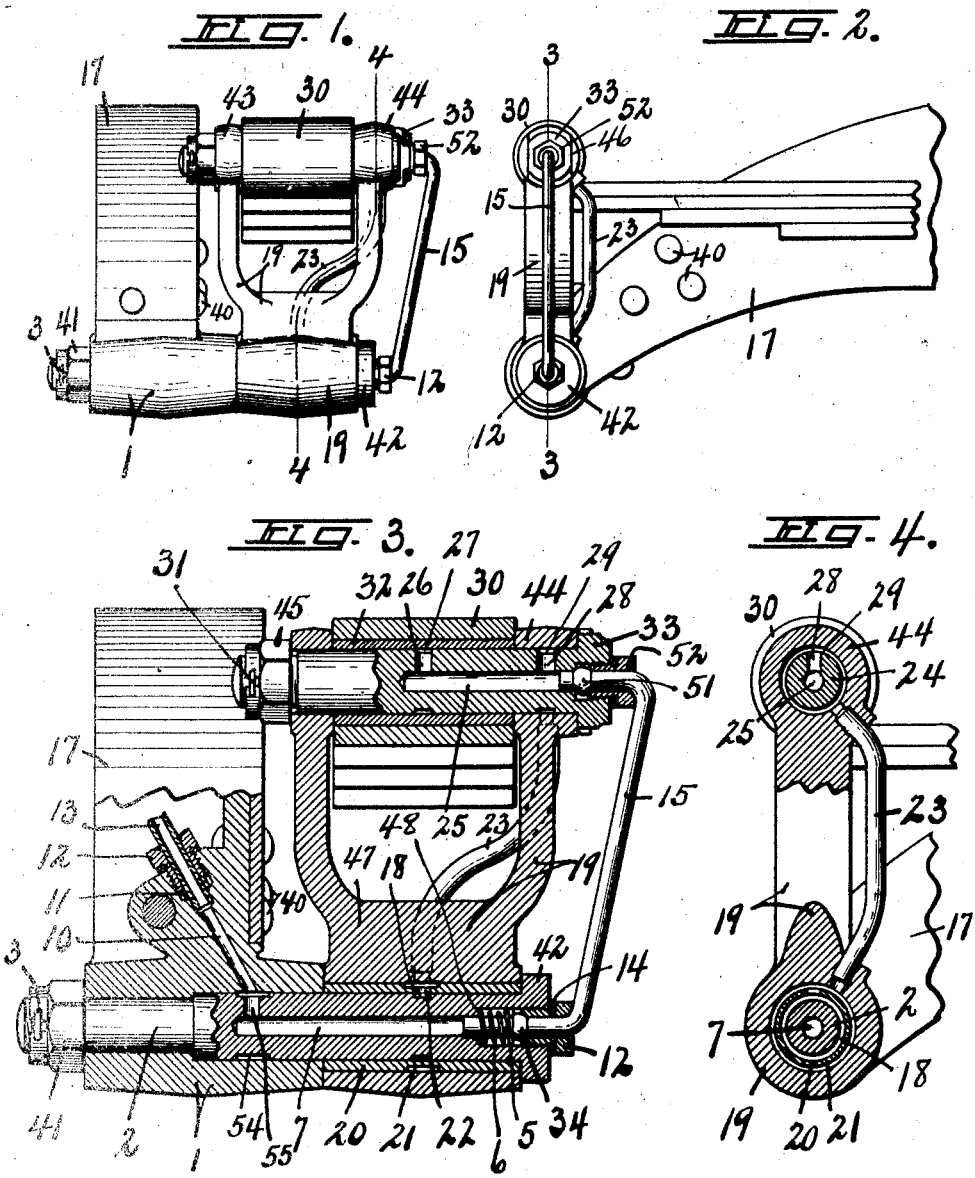

Patented May 12, 1925.

1,537,077

UNITED STATES PATENT OFFICE.

FREDERICK H. GLEASON, OF AUBURN, NEW YORK.

MEANS FOR LUBRICATING TENSION SHACKLES OF AUTOMOBILES.

Application filed July 18, 1923. Serial No. 652,373.

*To all whom it may concern:*

Be it known that I, FREDERICK H. GLEASON, a citizen of the United States of America, of Auburn, in the county of Cayuga, in the State of New York, have invented new and useful Improvements in Means for Lubricating Tension Shackles of Automobiles, of which the following, taken in connection with the accompanying drawings, is a full, clear, and exact description.

This invention relates to certain new and useful improvements in means for lubricating tension shackles of automobiles, particularly designed for use in connection with chassis lubricating systems for automobiles.

The main object of the invention is to supply lubricant from a single source equally to the upper and lower shackle bolts in a simple, economic and efficient manner.

Other objects and advantages relate to the details of construction, form and arrangement of the parts of the apparatus, all as will more fully appear from the following description taken in connection with the accompanying drawings, in which:—

Figure 1 is a rear view of a tension shackle of an automobile embodying my invention.

Figure 2 is a side view of the same.

Figure 3 is a section taken on line 3—3, Figure 2.

Figure 4 is a section taken on line 4—4, Figure 1.

As illustrated in the drawings, the rear shackle hanger bracket —1— is attached to the frame part —17— of an automobile in any suitable and ordinary manner, as by rivets —40—, the hanger bracket —1— being provided with a lubricant-supply tube —13— attached to the hanger —1— by means of a tubing nut —12— and tubing sleeve —11— of ordinary and well known construction. The supply tube —13— is thus placed in direct communication with a bore or passage —10— extending from the tube through the hanger bracket to the bore or transverse opening through the bracket provided for holding the lower shackle bolt —2—. The shackle bolt —2— is attached to the hanger —1— by means of a castellated nut —41— and cotter pin —3— when the head —42— is in contact with the end of the swing tension shackle —19—, which shackle is provided with a bushing —20— in a bore at its lower end, the bushing in turn being mounted upon the lower shackle bolt —2— between the head —42— of said bolt and the end of the hanger bracket —1—. The bushing —20— is provided with an annular groove —21— on its outside surface and with a bore or passage —22— extending thru the wall of the bushing for conveying lubricant to the exterior of the bolt —2—.

The upper shackle bolt —24— is held in place in the bosses —43— and —44— formed respectively in the upper ends of the spaced arms of the shackle by means of castellated nut —45— and cotter pin —31— when the head —33— of the bolt is in contact with the outer surface of the boss —44—. This bolt —24— supports the spring-eye —30— which is provided with a bushing —32— mounted on the bolt —24— between the bosses —43— and —44—.

The head —33— of the bolt —24— is flattened at opposite sides so as to fit into a milled slot —46— formed in the outer surface of the boss —44—. The bolt —24— is further provided with a longitudinal bore or conduit —25— in communication with lateral or radial bores —26— and —28— leading to circumferential grooves 27 and 29 respectively in the periphery or outer surface of the bolt —24—. The tube —23— attached at its upper end to substantially the central portion of the boss —44— is in communication with the peripheral groove —29— in the bolt —24— thru a passageway extending thru the boss —44—. This pipe —23— projects into an opening or passageway extending thru the lower boss —47— of the shackle —19— and may be secured thereto in any lubricant-tight manner and constitutes a passageway for conveying lubricant from the annular groove —29— of the upper shackle bolt —24— to the peripheral groove —21— extending around the outer surface of the bushing —20— and from said peripheral groove —21— thru radial passageway or opening —22— to the circumferential groove —18— extending around the surface of the lower shackle bolt —2—.

It will be obvious that the communication between the peripheral grooves —29— and —21— may be effected in various ways equivalent to the use of the tube —23— as for illustration by forming a bore thru the tension shackle —19— and leading directly from one groove to the other.

Means of communication is provided between the bore —7— in the lower shackle bolt and the bore —25— in the upper shackle bolt whereby lubricant may flow from the tube —13— to the bore —25— and thence to the peripheral groove —18—, and as illustrated this means is in the form of a tube —15— attached to the upper shackle bolt —24— by means of tubing nut —52— and sleeve —51— of ordinary construction, the outer end of the bore —25— being internally threaded for cooperation with the tubing nut —12—.

The lower end of the tube —15— is attached to the lower shackle bolt —2— by means of a swivel connection comprising an expanded oppositely tapered projection —34— of the tube —15—, the standard tubing nut —12— having a threaded engagement with the enlarged or chambered outer portion of the bore —7—, the gasket —14— for rendering such engagement lubricant-tight, the thrust washer —5— mounted on the tube —15— forward of the enlargement —34— and the spring —6— bearing at one end against the shoulder —48— and at its opposite end against the washer —5— to hold the enlarged oppositely tapered portion —34— of the tube —15— in tight engagement with a counter-sunk or tapered seat formed in the inner end of the tubing nut —12—, all as illustrated in my copending application Serial No. 657,372, filed July 19, 1923, upon swivel connection.

The bolt —2— is preferably provided with a circumferential groove —54— adjacent the point of termination of the bore —10— so that lubricant is fed from the tube —13— to the circumferential channel —54— and thence thru radial bore —55— in the bolt —2— to the longitudinal bore —7— which may, as shown, extend only partially thru the bolt —2— and leads from the radial bore —55— to the tube —15—. The operation of this construction will be well understood.

The satisfactory lubrication of shackle bolts of this character requires only a very small amount of lubricant, the bores of the tubes and bolts holding many times the volume actually required to properly lubricate the structure. Therefore, in order to assure that bolts —7— and —24— are positively supplied with lubricant when only a small volume is used, it is quite necessary to release the lubricant at the top point of the unit when it will be distributed by gravity and normal creeping action in substantially equal quantities to both bolts. The lubricant supplied through tube —13— passes thru bore —10— to the annular groove —54— and thru radial bore —55— to the longitudinal bore —7—. Thence the lubricant passes thru tube —15— to the longitudinal bore —25— in the bolt —24— and then upwardly thru lateral bores —26— and —28— feeding out into the circular grooves —27— and —29— in equal quantities, regardless of the volume of lubricant fed thru tube —13—. The lubricant feeding thru bore —26— fills the annular groove —27— and lubricates the shackle bolt, which bolt oscillates in bushing —32— mounted in spring-eye —30—. The annular groove —27— always provides a space or small reservoir in which some oil is trapped and stored. The lubricant feeding thru the radial bore —28— passes into the annular groove —29— which is in communication with the tube —23— and provides passage for the lubricant to the annular groove —21— on the outside of the bushing —20— in the lower part of shackle —19—. The radial bore —22— is adapted to convey this lubricant to the annular groove —18— in the lower shackle bolt —2— from which the lubricant spreads out to lubricate bolt —2— in the bushing —20— of the shackle —19—.

The movement of spring —30— causes shackle —19— to oscillate or swivel on bolt —2— which is attached in a stationary manner to the hanger bracket —1— and the swivel connection of tube —15— with bolt —2— permits of the required relative movement between tube —15— and bolt —2— without leakage of lubricant.

Altho I have shown and described a specific construction as illustrative of an embodiment of my invention, I do not desire to restrict myself to the details of form, construction or arrangement of the disclosed apparatus, as various changes may be made in each without departing from the invention as set forth in the appended claims.

I claim:—

1. In a structure of the class described, a hanger bracket, a bolt having one end mounted in said hanger-bracket, a shackle mounted on said bolt, said bolt formed with a longitudinal bore, means for supplying lubricant to the longitudinal bore in said bolt, an upper shackle-bolt mounted in said shackle and having a longitudinal bore, a tube connecting the longitudinal bores in said bolts for carrying lubricant from the longitudinal bore in the lower bolt to the longitudinal bore in the upper bolt, and means of communication between the longitudinal bore in the upper bolt and the bearing surface of the lower bolt for supplying lubricant to the latter from the former.

2. In a structure of the class described, a hanger bracket, a bolt having one end mounted in said hanger bracket, a shackle mounted on the other end of the bolt, said bolt formed with a longitudinal bore and a radial bore leading to the longitudinal bore, said bracket formed with a bore leading to the radial bore in the bolt, an upper shackle bolt mounted in said shackle and having a longitudinal bore and a radial bore, and a tube connecting said longitudinal bores in the bolts and having a swiveling connection with one of said bores.

3. In a structure of the class described, a hanger bracket, a bolt having one end mounted in said hanger bracket, a shackle mounted on said bolt, said bolt formed with a longitudinal bore, means for supplying lubricant to the longitudinal bore in said bolt, an upper shackle bolt mounted in said shackle and having a longitudinal bore, a tube connecting the longitudinal bores in said bolts, and having a swiveling connection with one of said bolts, for carrying lubricant from the longitudinal bore in the lower bolt to the longitudinal bore in the upper bolt, and means of communication between the longitudinal bore in the upper bolt and the bearing surface of the lower bolt for supplying lubricant to the latter from the former.

4. In a structure of the class described, a lower shackle bolt having a longitudinal bore, a shackle mounted on said bolt, an upper shackle bolt mounted in said shackle and having a longitudinal bore, and spaced radial bores, means for supplying lubricant to the longitudinal bore in the lower shackle bolt, a conduit for conveying lubricant from the bore in the lower shackle bolt to the longitudinal bore in the upper shackle bolt, and a conduit for conveying lubricant from one of said radial bores to the exterior surface of the lower shackle bolt.

5. In a structure of the class described, a hanger bracket, a lower shackle bolt mounted in said hanger bracket and having a longitudinal bore, a shackle mounted on said bolt for oscillatory movement thereon, an upper shackle bolt mounted in said shackle and having a longitudinal bore and a radial bore leading from the longitudinal bore to the periphery of the bolt and a tube having its opposite ends connected to the ends of said bolts and in communication with the respective bores therein for conveying lubricant from one to the other, and a conduit in communication with the longitudinal bore in the upper bolt and with the outer surface of the lower bolt.

6. In a structure of the class described, a lower shackle bolt having a longitudinal bore and a circumferential groove and a radial bore leading from the longitudinal bore to the groove, a hanger bracket carrying said bolt and having a bore leading to said groove, a shackle mounted on said bolt, an upper shackle bolt mounted in said shackle and having a longitudinal bore, and a plurality of radial bores leading from the longitudinal bore to the periphery of the bolt, said bolt formed with annular grooves in communication with the radial bores, a tube connected to the ends of said bolts and forming means of communication between the respective longitudinal bores, one of said connections permitting relative movement between the tube and the bolt, and a conduit leading from one of the annular grooves in the upper bolt to the exterior surface of the lower bolt.

In witness whereof I have hereunto set my hand this 10th day of July, 1923.

FREDERICK H. GLEASON.

Witnesses:
C. A. Bacon,
E. M. Salomon.